Sept. 2, 1958  R. E. DENNIS  2,849,778
CONFECTION BOX CLIP ATTACHMENT FOR SUN
VISORS OF AUTOMOTIVE VEHICLES
Filed Nov. 1, 1957
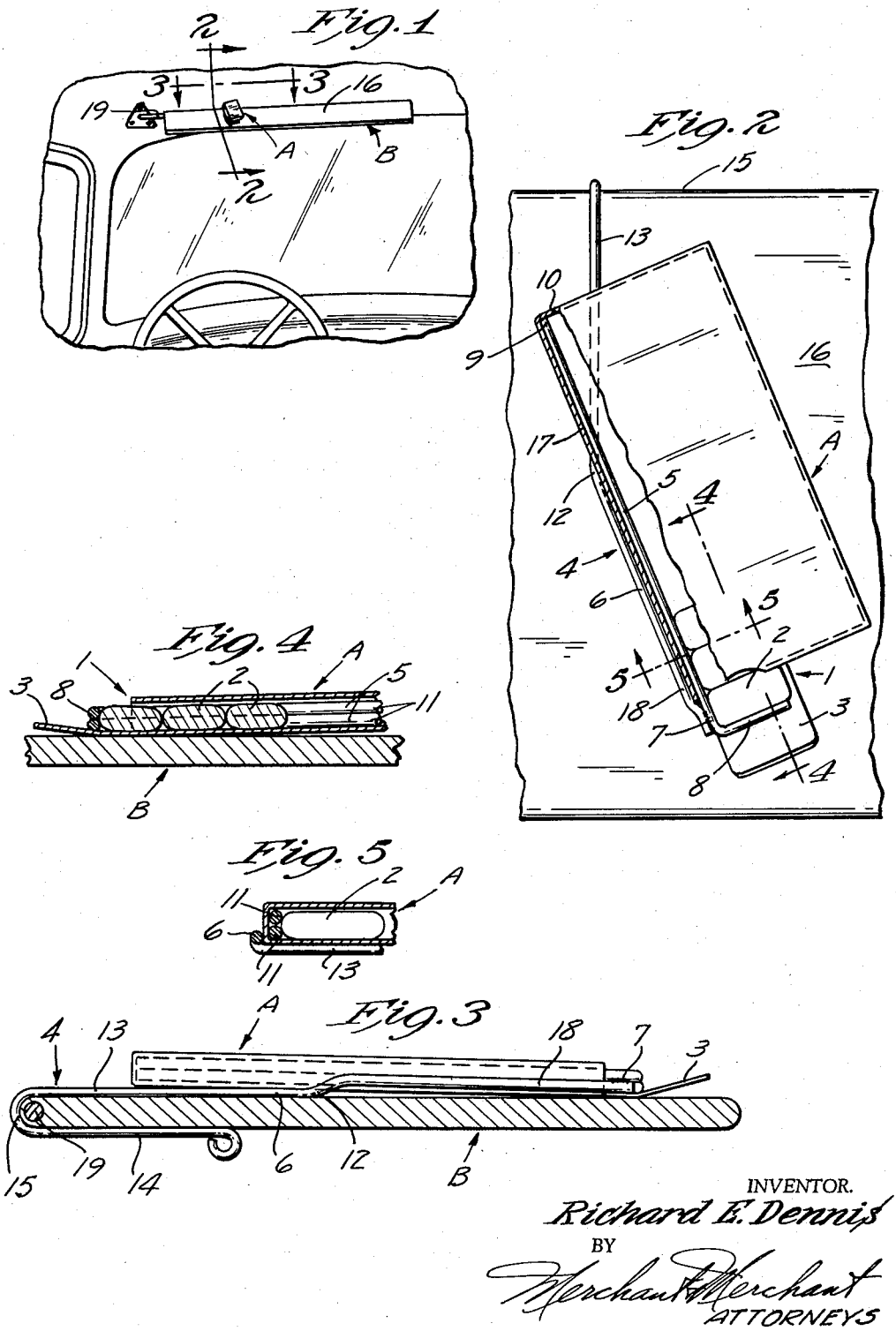
INVENTOR.
Richard E. Dennis
BY
Merchant & Merchant
ATTORNEYS

United States Patent Office 2,849,778
Patented Sept. 2, 1958

2,849,778

CONFECTION BOX CLIP ATTACHMENT FOR SUN VISORS OF AUTOMOTIVE VEHICLES

Richard E. Dennis, Minneapolis, Minn.

Application November 1, 1957, Serial No. 694,045

3 Claims. (Cl. 24—261)

My invention relates generally to clip attachments for the sun visors of automotive vehicles and the like and more particularly to such clip attachments for generally rectangular box like packages for confections, such as tablet form chewing gum.

The primary object of my invention is the provision of a device of the class described by which a box of chewing gum or the like in tablet form may be secured to the sun visor of an automotive vehicle in a manner whereby the contents or tablets are partially discharged from the open top thereof, one by one under action of gravity, so as to facilitate removal by the driver with a maximum of ease and a minimum of time.

A further object of my invention is the provision of a device of the class immediately above described which comprises a pair of relatively thin resilient fingers secured together in side by side relation at their inner ends, one of said fingers being relatively short with respect to the other thereof and adapted to be inserted into the discharge opening of a generally rectangular package for tablet shaped confections and to be held in snug engagement with one longitudinal side of said package by the other of said fingers with the outer surface of said longitudinal side, a barrier element carried by the inner end of one of said fingers and projecting at substantially right angles thereof transversely of said opening whereby to limit outward movement of tablets through said opening, the other of said fingers extending beyond the outer end of said one thereof and having its free end bent backwardly upon itself in a plane generally normal to the plane of said barrier to provide a clip-acting hook adapted to engage a side portion of a sun visor of an automotive vehicle.

A further object of my invention is the provision of a device of the class immediately above described in which the length of said relatively short finger with respect to said package is such that when the free end thereof is in engagement with the closed bottom end of said package, said barrier will be spaced from the discharge end of said package a distance less than the width of a tablet within said package but less than the thickness of said tablet, whereby under the action of gravity one tablet at a time is only partially passed through said opening but may be totally removed by the driver merely by snaking of the tablet between the upper end of the box and barrier.

A still further object of my invention is the provision of a device of the class above described in which the relatively long finger is bent, intermediate its end and said hook to provide an angular portion adapted to be interposed between the box or package and the sun visor when said hook is in operative position thereon, whereby to impart stability to the device.

A still further object of my invention is the provision of a device of the class above described which is inexpensive to produce, is easy to attach, is highly efficient in its operation, and is strong and durable.

The above and still further objects of my invention will becomes apparent from the following detailed specification, appended claims and attached drawings.

Referring to the drawings wherein like characters indicate like parts throughout the several views:

Fig. 1 is a fragmentary view in elevation of the interior of an automotive vehicle showing my novel device in operative position on the sun visor thereof;

Fig. 2 is an enlarged fragmentary view in top plan as seen substantially from the line 2—2 of Fig. 1, some parts being broken away and some parts shown in section;

Fig. 3 is an enlarged sectional view as seen from the line 3—3 of Fig. 1;

Fig. 4 is a fragmentary sectional view; and

Fig. 5 is a fragmentary sectional view as seen from the line 5—5 of Fig. 2.

Referring with greater particularity to the drawings, the letter A identifies a generally rectangular box or package for chewing gum tablets or the like. Such boxes are normally formed from paper board and the like so as to have some degree of rigidity. The box A is of the type having a partial discharge opening 1 in one end thereof for the tablets 2 within the box A. The box A is formed to provide an integral tongue like closure flap 3. The sun visor of the automotive vehicle is identified by the letter B.

My novel attachment clip 4, to facilitate the dispensing of the tablets 2 from the box or package A while same is held in convenient, relatively close proximity to the driver of the vehicle, comprises a pair of relatively thin resilient fingers 5 and 6 respectively which, preferably and as shown, are formed from wire stock. The fingers 5 and 6 are secured together as by welding or the like adjacent their inner ends, as indicated by the numeral 7, so that their inner end portions are in side by side relationship. The finger 5 is relatively short with respect to the finger 6 and is of a length with respect to a given box A so that the barrier element 8, preferably formed integrally therewith projects at right angles to the upper end thereof transversely of the discharge opening 1 in outwardly spaced relation thereto, when the free outer end 9 thereof is in engagement with the closed bottom 10 of the box A, for a purpose which will hereinafter be explained in greater detail. As shown particularly in Fig. 5, the finger 5 is formed with a pair of finger elements 11 retained in side by side relationship by welding or the like. Thus, the finger 5 has a width corresponding approximately to the interior width of the box A.

The relatively long finger 6 is bent intermediate its ends as indicated at 12 at which place there is also a slight offset to provide an angular portion 13 which is adapted to be interposed between the package A and the sun visor B when the hook 14 on the extended free end thereof is in operative engagement with one side portion of the sun visor B as shown in Fig. 2. This arrangement functions to angle the box or package A with respect to the visor B, as particularly shown in Fig. 2, so that the tables 2 will be directed toward the corner of the box A adjacent the barrier 8 for easy gravity outward flow thereof; also, portion 13 under box A tips the box A longitudinally with the closed bottom end slightly raised to assist the outward flow of the tablets 2, and further, this arrangement imparts considerable stability to the structure in that it tends to prevent rocking of the device 4 about the longitudinal axis of the finger 5. It will be noted that the hook 14 is formed by bending the free end of the relatively long finger 6 backward upon itself in a plane generally normal to the plane of the barrier 8.

When it is desired to use my novel structure, the tongue-like closure flap 3 of the package A is opened, and the package A is then attached to the clip 4. The relatively short finger 5 is moved into the discharge opening 1 along one side wall 17 of the box or package A. The inner end portion 18 of the relatively long finger 6 will then preferably be in tight engagement with the outer surface of the side wall 17, which is disposed between inner end portion 18 and the relatively short finger 5. Relatively short finger 5 is moved into the box A until the free end 9 thereof engages the closed bottom 10 of the box A; at which position, it should be noted the barrier 8, which overlies the flap 3, extends transversely of the discharge opening 1 in outwardly spaced relation thereto, and specifically, a distance somewhat less than the width of the tablets 2 within the box A but slightly greater than the thickness of said tablets 2. The clip 4 may then be attached to the sun visor B by passing hook 14 over one longitudinal edge thereof, preferably the upper edge 15 of the sun visor B, with the angular portion 13 disposed generally at right angles to edge 15 so that box A is disposed at an angle to the sun visor B as shown in Fig. 2. With this arrangement, when the sun visor B is caused to assume a more or less vertical position, by rotating same about the longitudinal axis of the rod 19 upon which it is mounted, the tablets 2, under the action of gravity, tend, one by one, to be partially exposed within the discharge opening 1, the barrier 8 restricting total accidental outward passage thereof through said opening 1. In order to totally remove a tablet 2 from the position shown in Fig. 2, one has merely to turn or twist the same sideways so as to permit the passage of the relatively narrow or thickness portion thereof between the barrier 8 and the adjacent end of the package A defining the discharge opening 1. Obviously, as each successive tablet 2 is removed, another is fed into its place against the barrier 8, under the action of gravity. Thus, the driver of the vehicle always has readily accessible a fresh tablet 2.

My invention has been thoroughly tested and found to be completely satisfactory for the accomplishment of the above objects and while I have shown a preferred embodiment thereof, it should be understood that same is capable of modification without departure from the scope and spirit of the appended claims.

What I claim is:

1. In a device of the class described, a pair of relatively thin resilient fingers secured together in side by side relation at their inner ends, one of said fingers being relatively short with respect to the other thereof and adapted to be inserted into the discharge opening of a generally rectangular package for tablet shaped confections and to be held in relatively snug engagement with one longitudinal side of said package by engagement of the other of said fingers with the outer surface of said longitudinal side, a barrier element carried by the inner end of one of said one and said other fingers and projecting substantially at right angles thereof transversely of said opening but spaced therefrom whereby to limit outward movement of tablets through said opening, said other of said fingers extending beyond the outer end of said one relatively short finger and having its free end bent backwardly upon itself in a plane generally normal to the plane of said barrier to provide a clip-acting hook adapted to engage a side portion of a sun visor of an automotive vehicle.

2. The structure defined in claim 1 in which the length of said relatively short finger with respect to said package is such that when the free end thereof is in engagement with the closed bottom end of said package, said barrier will be spaced from the discharge end of said package a distance less than the width of a tablet within said package but greater than the thickness of said tablet.

3. The structure defined in claim 1 in which said other finger is bent intermediate its inner end and said hook to provide an agular portion adapted to be interposed between said package and said visor when said hook is in operative position.

No references cited.